(12) United States Patent
Casagrande

(10) Patent No.: US 10,367,913 B2
(45) Date of Patent: Jul. 30, 2019

(54) SYSTEMS AND METHODS FOR TRACKING USER BEHAVIOR USING CLOSED CAPTION TEXT

(71) Applicant: ECHOSTAR TECHNOLOGIES L.L.C., Englewood, CO (US)

(72) Inventor: Steven Michael Casagrande, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 14/724,470

(22) Filed: May 28, 2015

(65) Prior Publication Data
US 2016/0192003 A1 Jun. 30, 2016

Related U.S. Application Data

(60) Provisional application No. 62/097,241, filed on Dec. 29, 2014.

(51) Int. Cl.
H04H 60/32 (2008.01)
H04L 29/08 (2006.01)
(Continued)

(52) U.S. Cl.
CPC .......... *H04L 67/327* (2013.01); *G06F 3/0481* (2013.01); *G06F 3/0482* (2013.01); *G06Q 30/0242* (2013.01); *H04L 51/04* (2013.01); *H04L 51/10* (2013.01); *H04L 51/16* (2013.01); *H04L 51/32* (2013.01); *H04L 65/4084* (2013.01); *H04L 65/4092* (2013.01); *H04N 1/00408* (2013.01); *H04N 1/00501* (2013.01); *H04N 21/23109* (2013.01); *H04N 21/252* (2013.01); *H04N 21/25866* (2013.01);
(Continued)

(58) Field of Classification Search
CPC ......... H04N 21/4667; H04N 21/23109; H04N 21/252; H04N 21/25866; H04N 21/44222; H04N 21/47217; H04N 21/4884; G06Q 30/0242
See application file for complete search history.

(56) References Cited

U.S. PATENT DOCUMENTS 5,703,655 A * 12/1997 Corey .................. G11B 27/105
348/468
6,637,032 B1 * 10/2003 Feinleib ............ G06F 17/30017
348/552
(Continued)

Primary Examiner — Nasser M Goodarzi
Assistant Examiner — Patrick A Ryan
(74) Attorney, Agent, or Firm — Lorenz & Kopf LLP

(57) ABSTRACT

Methods, systems and devices for characterizing user viewing behavior are described. A method of tracking user viewing includes presenting media content to a user via a media device, the media content including closed-caption information, and determining that a user has initiated, at a first time, a user interface event (e.g., a "trick-mode" event) that modifies a playback rate of the media content. An offset time is determined, corresponding to a difference between the first time and a second time corresponding to an occurrence of a unique string within the closed-caption information Viewing behavior of the user is then characterized based on the media content, the offset time relative to the unique string, and an event type associated with the user interface event.

14 Claims, 4 Drawing Sheets

(51) Int. Cl.
  *H04N 21/466* (2011.01)
  *G06Q 30/02* (2012.01)
  *H04N 21/442* (2011.01)
  *H04N 21/472* (2011.01)
  *H04N 21/488* (2011.01)
  *H04N 21/258* (2011.01)
  *H04N 1/00* (2006.01)
  *G06F 3/0481* (2013.01)
  *G06F 3/0482* (2013.01)
  *H04N 21/231* (2011.01)
  *H04N 21/25* (2011.01)
  *H04L 12/58* (2006.01)
  *H04L 29/06* (2006.01)
  *H04N 21/658* (2011.01)

(52) U.S. Cl.
  CPC ... *H04N 21/44222* (2013.01); *H04N 21/4667* (2013.01); *H04N 21/47217* (2013.01); *H04N 21/4884* (2013.01); *H04N 21/6582* (2013.01)

(56) References Cited

U.S. PATENT DOCUMENTS

| | | | |
|---|---|---|---|
| 7,555,196 B1* | 6/2009 | Crawford | G11B 27/10 348/170 |
| 8,671,423 B1* | 3/2014 | Chang | H04N 21/4126 705/14.4 |
| 2007/0294729 A1* | 12/2007 | Ramaswamy | H04H 60/58 725/53 |
| 2008/0196054 A1* | 8/2008 | Zarudyanskiy | H04H 60/66 725/20 |
| 2009/0094659 A1* | 4/2009 | Candelore | H04N 5/4403 725/131 |
| 2015/0365730 A1* | 12/2015 | Mohan | H04N 21/47217 725/21 |

* cited by examiner

SYSTEMS AND METHODS FOR TRACKING USER BEHAVIOR USING CLOSED CAPTION TEXT

CROSS-REFERENCE TO RELATED APPLICATIONS

This application claims priority to U.S. Provisional Patent App. No. 62/097,241, filed Dec. 29, 2014, the contents of which are hereby incorporated by reference.

TECHNICAL FIELD

The present disclosure generally relates to the viewing of media content. More particularly, the following discussion relates to systems, methods, and devices for tracking user viewing behavior.

BACKGROUND

Modern entertainment devices such as set-top boxes, digital video recorders, placeshifting devices, and the like, typically provide a user interface that allows the viewer to fast-forward, reverse, play in slow-motion, and otherwise move back and forth with respect to the content being viewed. In this regard, digital devices such as digital video recorders (DVRs) and over-the-top (OTT) systems will often incorporate a "trick-mode" that quickly displays certain frames of the media content as the user activates the fast-forward and reverse features.

Because of the variability in the length of commercial advertisements, as well as other factors, it is very difficult to track exactly where within a media stream the user has activated a trick-mode feature. This is unfortunate, as such information would be particularly useful in tracking user viewing behavior—e.g., which scenes in a movie tend to be skipped over, which scenes are often replayed, which advertisements are actually viewed by users, and so on.

Accordingly, there is a need for systems, devices, and techniques for better tracking user viewing behavior. These and other desirable features and characteristics will become apparent from the subsequent detailed description and the claims, taken in conjunction with the accompanying drawings and this background section.

BRIEF SUMMARY

Several examples of systems, devices, methods, user interfaces are described for characterizing user viewing behavior. A method of tracking user viewing in accordance with one embodiment includes presenting media content to a user via a media device, the media content including closed-caption information, and determining that a user has initiated, at a first time, a user interface event (e.g., a "trick-mode" event, such as fast-forward, rewind, or the like) that modifies a playback rate or playback position of the media content. An offset time is determined, corresponding to a difference between the first time and a second time corresponding to an occurrence of a unique string within the closed-caption information. Viewing behavior of the user is then characterized based on the media content, the offset time, and an event type associated with the user interface event.

A media device in accordance with one embodiment includes a processor and a memory. The memory is configured to store computer-readable software code adapted to cause the processor to: present media content to a user, the media content including closed-caption information; determine that a user has initiated, at a first time, a user interface event that modifies a playback rate of the media content; determine an offset time corresponding to a difference between the first time and a second time corresponding to an occurrence of a unique string within the closed-caption information; and characterize viewing behavior of the user based on the media content, the offset time, and an event type associated with the user interface event.

Alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

Systems and methods are provided for characterizing user viewing behavior by determining—based on closed-captioning information included in media content—the time at which certain "trick-mode" functions (rewind, fast-forward, skip forward, skip ahead, and the like) are initiated by the user. In one embodiment, an "offset time" is determined based on when the event occurred relative to the time at which a unique string of characters appears in the closed-captioning information. Such data may be aggregated for multiple users, providing insight regarding which portions of the media content tends to be skipped over, which portions tend to be avoided, and so on. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
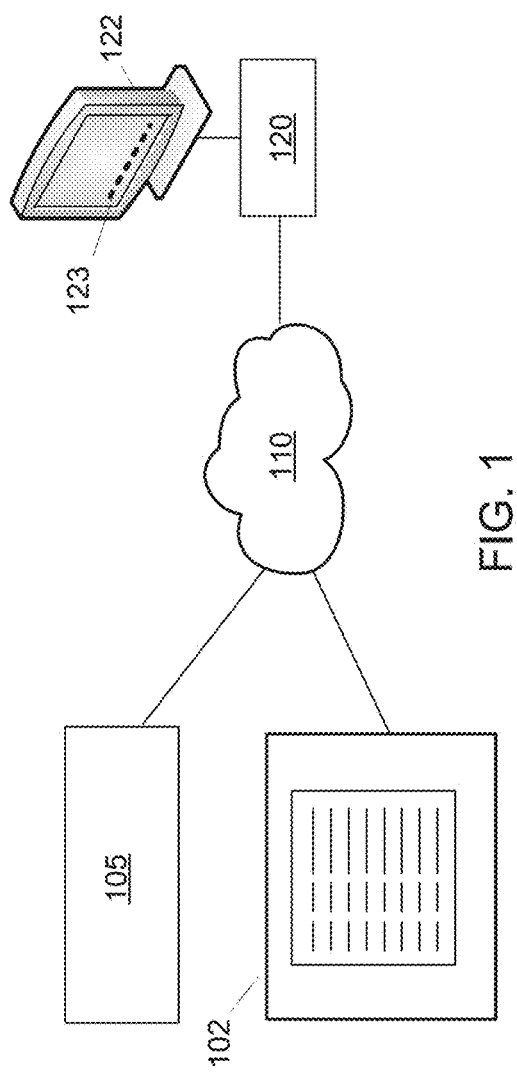
FIG. 1 is a conceptual block diagram illustrating a system for viewing media content in accordance with one embodiment.

Referring to FIG. 1, a media viewing system useful in describing the present invention generally includes a media content source (or simply "content source") 105 communicatively coupled, over a network 110, to a media device 120 (with one or more associated displays 122). Network 110 may any form of network now known or later developed, including, for example, one or more satellite networks, cable networks, over-the-air (OTA) networks, or over-the-top (OTT) delivery networks. Device 120 may correspond to any combination of hardware and software configured to receive and process media content from content source 102, including, for example, a mobile telephone, a computer system (such as desktop computer, laptop computer, tablet computer, or the like), a set top box, a television receiver, or a dedicated media player. Device 120 is typically also able to process and display closed captioning information (123) embedded within the media content, as is known in the art. As will be described in further detail below, the system also includes a data aggregation server (or simply "server") 102, which is configured to receive user behavior data from a plurality of devices such as device 120 and store the aggregated user behavior data (103) for subsequent analysis. While the environment illustrated in FIG. 1 is shown as a single network 110, in practice the environment may include any number of wired and/or wireless network operating within the geographic proximity of a home, office or other structure and that are generally under the control of a single user, family or operator.

Figure 2:
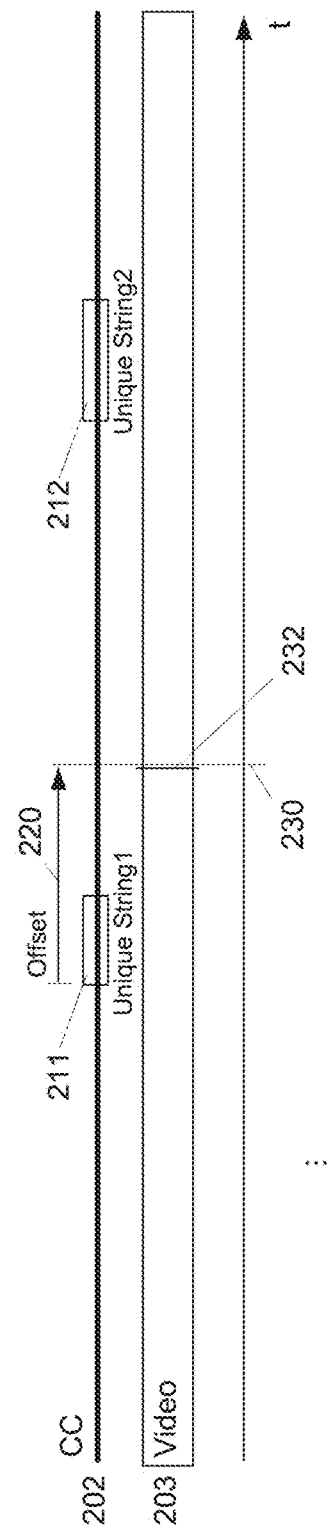
FIG. 2 is a conceptual diagram illustrating the use of closed-captioning information in accordance with one embodiment.

As mentioned briefly above, systems and methods are provided for characterizing user viewing behavior by determining the time at which certain "trick-mode" functions (rewind, fast-forward, skip ahead, skip forward, and the like) are initiated by the user based on closed-captioning information included in media content being viewed by the user. In that regard, FIG. 2 depicts, in an abstract form, closed caption (CC) information 202 and corresponding video information 203 for example media content as function of time. As known in the art, CC information 202 comprises text corresponding to dialog and other audio content contained within the video information 203. CC information 202 may, for example, conform to EIA-608, also known as "line 21 captions" as widely used in the United States.

In accordance with various embodiments, CC information 202 contains one or more unique strings 211, 212, etc. These unique strings can be used to determine an offset 220 from a trick-mode event 230 that occurs within a particular location 232 of video information 203. A string 211, 212 within CC information 202 is preferably "unique" in the sense that it only occurs once within the program being viewed. Thus, for example, recurring catch-phrases that occur multiple times in a situation comedy would likely not qualify as "unique," while relatively rare phrases might be sufficiently unique. The location of these unique strings may be determined in real-time or after recording the event by media device 120, or may be determined by server 102 prior to providing the media content to media device 120. The task of finding unique substrings within a larger string using computer algorithms is well known and need not be described in detail herein.

Figure 4:
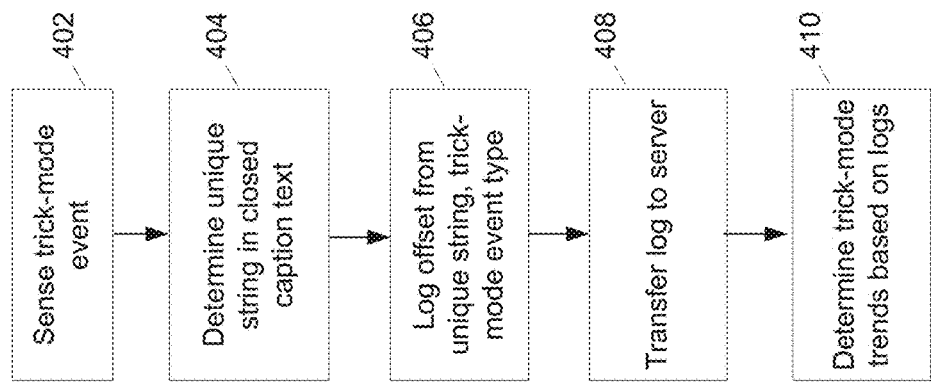
FIG. 4 is a block diagram illustrating a method in accordance with one embodiment.

FIG. 4 is a flow-chart depicting, in the general sense, a method in accordance with one embodiment. As shown, in step 402, the system (e.g., media device 120) senses that a trick-mode event has occurred during playback of known media content. At that point, the media device 120 determines the location of a unique string within the closed-caption text (step 404). Alternatively, media device 120 may know, a priori, the location of one or more unique strings within the closed-caption text. Such information may be provided, for example, by server 102. The media device 120 then logs information regarding the trick-mode event—e.g., an offset associated with the temporal distance between the unique string and the trick-mode event, the trick-mode event type, an identifier of the user (or of the particular media device being used), and an identifier of the media content being viewed at the time of the trick-mode event. (Step 406). This log file is then transferred (at regular intervals, in response to a transfer request, or the like) to a remote aggregation server (step 408), which then determines trick-mode trends and other user behavior based on the transferred log file along with a number of other such log files received from other users and media devices (step 410).

Figure 3:
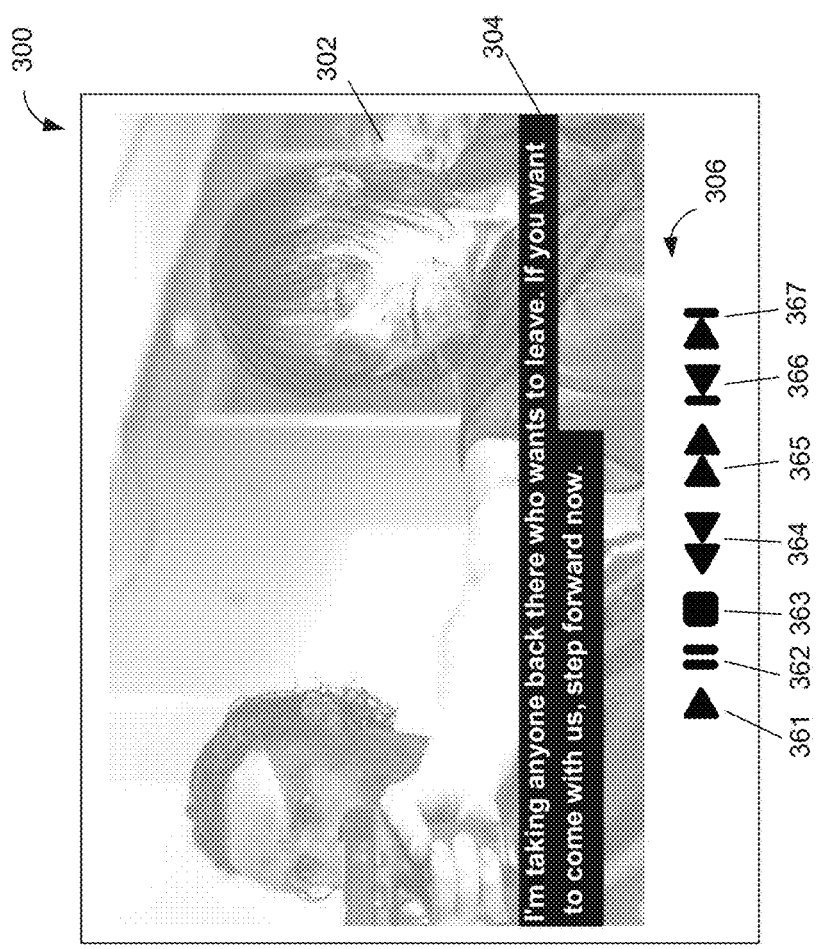
FIG. 3 illustrates the display of media content accompanied by a user interface providing trick-mode events.

FIG. 3 depicts an example of media content 302 displayed along with its corresponding closed-caption information 304 and a user interface 306 including icons that can be actuated to effect certain trick-mode events, such as play 361, pause 362, stop 363, fast rewind 364, fast forward 365, skip backward 366, and skip forward 367. While FIG. 3 shows, for the purpose of illustration, closed-captioning information 304 being displayed while viewing the media content 302, it will be appreciated that the closed-captioning information need not be displayed to implement the methods of the present embodiments. Similarly, it will be appreciated that the trick-mode events may be initiated using a variety of input methods, such as remote control device, a mouse pointer, etc.

With reference to FIG. 3, it might be determined that the phrase "step forward now" is unique within the closed-caption information for media content 302. The time at which that string appears within the closed-caption information (e.g., 34 minutes from the beginning of the episode) can then be used as an anchor or reference. That is, if the user selects, for example, to rewind (364) the media content 23.0 seconds after the string "step forward now" appears, the resulting offset can be determined and stored for future reference. Similarly, when the user decides to resume playback (361), another offset for that event can be stored. As a result, the system compiles accurate information (i.e., accurately synched with video playback) regarding the user's interaction with the trick-mode controls. The storage of such offset information may take a variety of forms and may be stored in any suitable data structure, including plain-text files, encrypted files, and the like. In accordance with the above example, for instance, the system may store (e.g., amend a log file with) the following information (note that the format, data types, etc. are not intended to be limiting):

| Media Content ID | Event Type | Offset | Unique |
|---|---|---|---|
| Walking Dead S5 EP8 | Rewind | 23 s | UniqueString1 |

Characterization of user viewing behavior might include, for example, which scenes tend to be skipped over by a number of people (e.g., a "pie-in-the-face" scene), which scenes are often replayed (such as the scene illustrated in FIG. 3), which advertisements are actually viewed by users, and so on. In addition, more specific information regarding individual users (in addition to crowdsourced information regarding multiple users) may be determined, such as what types of commercials (e.g., BMW commercials) a specific user is likely to watch. Such information would be of obvious value to advertisers.

Figure 5:
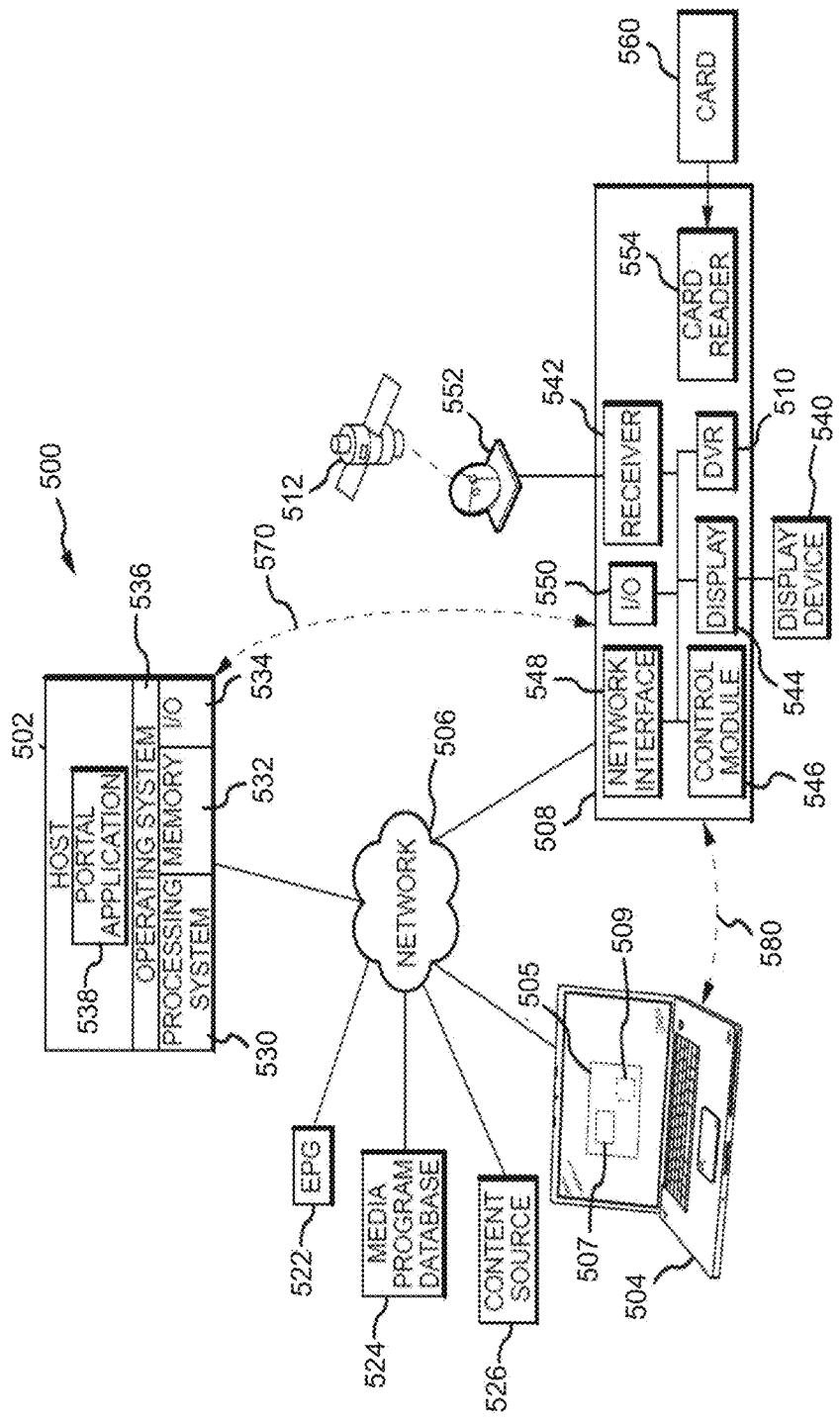
FIG. 5 is a block diagram illustrating a place-shifting system in which the present embodiments may be implemented.

The above systems and methods may be implemented in the context of a wide variety of entertainment devices and systems. FIG. 5 depicts one, non-limiting, example: a system 500 for placeshifting, broadcasting, or otherwise transferring data or content, such as a media program (or media content), from a source electronic device 508 to a destination electronic device 504 over a network 506 for presentation to a user (or viewer) on the destination electronic device 504. Thus, media content source 102 of FIG. 1 may be implemented as content source 526, and media device 160 of FIG. 1 may correspond to device 504 or 508. For purposes of explanation, but without limitation, the source device 508 may be alternatively referred to herein as a media device or a placeshifting device, and the destination electronic device 504 may be alternatively referred to herein as a playback device or a client device (or client). The placeshifting system 500 also includes a host server 502 (or host) that communicates or otherwise interacts with the devices 504, 508 over the network 506 to facilitate establishment of a peer-to-peer connection 580 over the network 506, which may be utilized for a placeshifting session, as described in greater detail below. It should be understood that FIG. 5 is a simplified representation of the placeshifting system 500 for purposes of explanation is not intended to limit the subject matter described herein in any way.

In practice, the client device 504 may be any device, component, module, hardware and/or the like that is capable of communicating with the server 502 over network 506. For example, depending on the embodiment, client device 504 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 506 and presenting audio and/or visual content. In this regard, the client device 504 includes a display device, such as a monitor, screen, or another conventional electronic display, capable of graphically presenting visual content, data and/or information that is generated or otherwise provided by an application 505, 507 executing on the client 504. The client device 504 may further include a user input device, such as a keyboard, a mouse, a touchscreen, or the like, capable of receiving input data and/or other information from the user of the client device 504. The client device 504 also includes a processing system and a data storage element (or memory) that is coupled to or otherwise accessed by the processing system and stores programming instructions that, when read and executed, cause the processing system of the client device 504 to generate one or more applications 505, 507, 509 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 504 may reside at a geographic location that is remote or otherwise physically distinct from the geographic location of the media device 508. In this regard, the media device 508 may have an essentially fixed or permanent geographic location, whereas the geographic location of the client 504 may be transient or otherwise variable with respect to the location of the media device 508. For example, the media device 508 may be realized as a set-top box or a similar device that resides at a user's home for providing media content to the user's television or other home display device 540, while the client 504 is realized as a portable electronic device, such as a mobile phone or other mobile computing device, that moves about with the user.

In the embodiment shown in FIG. 5, client device 504 executes a conventional browser or other client application 505 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, client 504 further includes a media player application 507. The media player 507 may be a standalone media player, or the media player 507 may be implemented as a plugin or other applet that runs within the client application 505 as desired. In some embodiments, media player 507 is initially obtained from a networked host, such as server 502. The media player 507 may be retrieved on an as-needed basis in some embodiments, or may be stored at client 504 for subsequent execution.

With continued reference to FIG. 5, in exemplary embodiments, media device 508 is any form of device, module, component, hardware and/or the like capable of receiving and processing media content from one or more content sources. For example, in some embodiments, media device 508 is a set-top box (STB) or similar system that is able to receive television programming and/or to record certain programs that can be viewed on a display device 540, such as a television, monitor, liquid crystal display (LCD), light emitting diode (LED) display, plasma display, or the like. Exemplary embodiments of media device 508 will therefore include or otherwise be coupled to a receiver interface 542 for receiving satellite, cable, IP/OTT, and/or broadcast programming signals from broadcast sources 512, as well as a data storage medium 510 (e.g., a hard disk, flash memory, or another suitable non-volatile data storage element) to support a digital video recorder (DVR) feature and/or functionality, a display interface 544 for providing imagery to the display device 540, and a control module 546 that directs the operations of the media device 508 as appropriate. For convenience, but without limitation, the data storage medium 510 is alternatively referred to herein as a DVR. Media device 508 may also include one or more interfaces 548 to the network 506 and/or an input/output interface 550 to a remote control or other device for providing user inputs to the media device 508, as appropriate. For example, the network interface(s) 548 of the media device 508 may include an interface or port for a wired communications layer (e.g., an Ethernet port or adapter), an interface for a wireless communications layer (e.g., an IEEE 802.11-compatible transceiver), and/or the like.

The components in media device 508 may be provided within a common chassis or housing as depicted in FIG. 5, although equivalent embodiments may implement media device 508 with any number of inter-connected but discrete components or systems. For example, in some embodiments, the media device 508 may be realized as a combination of a STB and a placeshifting device, wherein some features of the media device 508 (e.g., the DVR 510, the receiver 542, the display interface 544, and/or I/Os 550) are implemented by the STB and other features of the media device 508 (e.g., the network interface 548) are implemented by the placeshifting device, wherein the placeshifting device works in conjunction with the STB to shift the viewing experience from a home television (e.g., display device 540) to a viewing display on the client device 504 that is accessed via the network 506. Examples of placeshifting devices that may be used in some embodiments of media device 508 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 508 may be a hybrid DVR and/or receiver, for example, that also provides transcoding and placeshifting features. It should be appreciated that FIG. 5 depicts merely one exemplary embodiment of a media device 508, and in practice, the media device 508 may be logically and physically implemented in any manner to suit the needs of a particular embodiment.

In the exemplary embodiment illustrated in FIG. 5, media device 508 is capable of receiving digital broadcast satellite (DBS) signals transmitted from a broadcast source 512, such as a satellite, using an antenna 552 that provides received signals to the receiver 542. Equivalent embodiments, however, could receive programming at receiver 542 from any sort of cable connection, broadcast source, removable media, network service, external device and/or the like. In some embodiments, the media device 508 may also include an access card interface or card reader 554 adapted to receive an access card 560 (or viewing card) configured to ensure that the viewer is authorized to view media content provided to the primary display device 540. In this regard, the access card 560 includes unique identification information associated with a particular subscriber to the broadcast content source 512 or otherwise includes subscription information that facilitates receiving and/or decoding media content provided by the broadcast content source 512.

The DVR 510 feature stores recorded programming (e.g., recorded broadcast programming received via receiver 542) on a hard disk drive, memory, a networked server, or other storage medium as appropriate in response to user/viewer programming instructions, wherein the recorded programming may be subsequently viewed via the media device 508, either on display device 540 or client device 504 via network 506. Content stored in DVR 510 may be any sort of file-based programming or other content that is accessible to media device 508. In various embodiments, in addition to storing broadcast programming, the DVR 510 may also store programming received from other sources not illustrated in FIG. 5, such as, for example, programming downloaded from an on-demand programming source or an online programming source. Additionally, content in DVR 510 may be stored in any sort of compressed or uncompressed format, as desired, and may be encoded or transcoded as desired for effective receipt, storage, retrieval and playing.

The control module 546 is any sort of hardware, circuitry, processing logic and/or other components capable of directing the operations of media device 508. In various embodiments, control module 546 includes software or firmware logic and/or other programming instructions residing in a memory and executing on any sort of processing system, such as any sort of processor, microprocessor, microcontroller, digital signal processor or the like. The instructions, when read and executed, cause the control module 546 to perform various tasks, functions, processes and/or operations and otherwise support the subject matter described herein. In various embodiments, the control module 546 is based upon a "system on a chip" (SoC) implementation that incorporates a hybrid microcontroller with memory, input/output and other features to perform the various signal processing and other actions of media device 508. Other embodiments may implement control module 546 and/or the other features of media device 508 with any number of discrete and/or integrated processing components (e.g., any sort of microprocessor or microcontroller), memories, input/output features and/or other features as desired. The control module 546 communicates with the network interface 548 to establish a peer-to-peer connection 580 to the client device 504 over the network 506 and support streaming of media programs (e.g., from the DVR 510 or the receiver 542) to the client device 504 over the network 506 via the peer-to-peer connection 580, as described in greater detail below.

In the embodiment of FIG. 5, the network 506 is any communications network (or a combination of communications networks) capable of transmitting data between devices within the system 500. In various embodiments, network 506 includes any number of public or private data connections, links or networks supporting any number of communications protocols. Network 506 may include the Internet, for example, or any other network. Such networks may be based upon TCP/IP or other conventional protocols, although other embodiments may use any type of alternate or successor protocols, as desired. In various embodiments, network 506 may also incorporate a wireless and/or wired telephone network, such as a cellular communications network for communicating with mobile phones, personal digital assistants, and/or the like. Various embodiments of network 506 may also incorporate any sort of wireless or wired local area networks (LANs), wide area networks (WAN), or the like.

In the illustrated embodiment of FIG. 5, the server 502 may be realized as one or more server computers or other device(s) coupled to the network 506 and capable of interacting with the devices 504, 508 to facilitate communications between the client device 504 and the media device 508 associated with the user or operator of the client 504. The server 502 may be implemented with a server computer system or data processing system that is based upon any processor, architecture and/or operating system, and will typically be implemented using a processing system 530, memory 532, and input/output features 534. Various embodiments may be implemented using dedicated or shared hardware servers; other implementations may make use of virtual server features as part of a "cloud computing" service, such as any of the cloud computing services provided by any number of providers.

While FIG. 5 illustrates a single server 502, many practical embodiments of the system 500 may provide a cluster or other collection of multiple host servers 502 to support any desired number of simultaneous communications with multiple clients 504 and/or multiple media devices 508. This cluster may also incorporate appropriate routing, load balancing, access and security mechanisms and or any number of other features. In various embodiments, each server 502 is an actual or virtual computer system executing an operating system 536 in conjunction with the processing system 530, memory 532 and/or I/O features 534 to provide a computing core that is capable of executing a portal application 538, as well as any number of daemons, processes, applications or other modules as desired. For example, a portal application 538 could execute as a daemon on the server 502, with connections to separate clients 504 being managed as separate processes or instances that communicate with portal application 538 using features provided by operating system 536. In one or more embodiments, the memory 532 stores programming instructions that, when read and executed, cause the processing system 530 to create, generate, or otherwise facilitate the portal application 538 and perform various tasks, functions, processes and/or operations described herein. In this regard, the memory 532 represents any non-transitory short or long term data storage element or other computer-readable media capable of storing programming instructions for execution by or on the processing system 530.

The user of the client 504 is able to connect to the portal application 538 supported by host 502 via the network 506, for example, by directing the client application 505 to a URL or other network address associated with host 502 and/or portal application 538. In exemplary embodiments, after the user is successfully authenticated by the portal application 538, the host 502 and/or portal application 538 establishes a connection 570 over the network 506 to the media device 508 that is associated with the user. Thereafter, the host 502 and/or the portal application 538 utilizes the connection 570 to obtain, from the media device 508 via the network 506, information about programming stored at the media device 508 and available for placeshifting to the client device 504, such as, for example, a listing of the media programs stored on DVR 510. It should be noted that although FIG. 5 depicts the network connection 570 as being between the host 502 and the media device 508, in practice, the placeshifting system 700 may include one or more intermediary components (e.g., one or more message servers) configured to establish, facilitate, or otherwise support the connection 570.

Server 502 is coupled to an electronic program guide 522, which may be realized as a server, a database, or another device operating on the network 506 that maintains information pertaining to current and/or future broadcasts (or airings) of media programs that are available to be received from broadcast source 512 (e.g., by the media device 108 via receiver 542 and/or antenna 552). The server 502 and/or the portal application 538 may obtain information pertaining to current and/or future broadcasts (or airings) of media programs from the electronic program guide 522 and generate or otherwise provide a program guide graphical user interface (GUI) display on the client device 504 (e.g., within client application 505) that indicates media programs that are or will be available for streaming from the media device 508. The user of the client device 504 may manipulate or otherwise utilize the graphical user interface (or the graphical user interface elements contained therein) to select or otherwise identify media programs for streaming to the client device 504 and/or recording to the DVR 510. The user may pause or otherwise stop presentation of the streamed media program and manipulate or otherwise operate the client application 505 to transmit or otherwise provide 512, via the network 106, a request for content to a third-party content source 526 (e.g., a third-party website). The third-party content source 526 responds to the request by transmitting or otherwise providing content to the client device 504 via the network 506.

In the illustrated embodiment of FIG. 5, the placeshifting system 500 also includes a media program database 524 that includes verified or validated metadata and/or other descriptive information for a vast array of media programs. For example, the media program database 524 may contain metadata and/or other descriptive information pertaining to substantially all of the media programs that may be available from one or more content sources within placeshifting system 500 (e.g., information pertaining to any media programs that have previously been aired by a broadcast source 512, along information pertaining to any movie that has been presented in theaters, made available on-demand, or released for individual use (e.g., on digital video disc (DVD) or the like)). In exemplary embodiments, for each media program having a record (or entry) in the media program database 524, the media program database 524 maintains a media data object that includes one or more fields of metadata associated with that media program along with one or more fields of program identifiers that may be used to identify that media program record. In this regard, the program guide 522 and the media program database 524 may utilize the same program identifiers to uniquely identify each media program.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of tracking user viewing behavior, comprising:
    presenting media content to a user via a media device, the media content including closed-caption information;
    determining that a user has initiated, at a first time, a user interface event that modifies a playback rate or playback position of the media content;
    determining, by the media device, whether a phrase comprising a string of characters appearing within close caption information is an unique phrase by disqualifying recurring catch-phrases occurring multiple times in a program as not likely sufficiently unique and qualifying relatively rare phrases occurring in the program as likely sufficiently unique, and further deeming a phrase occurring only once in the program as qualifying preferentially as unique;
    determining, at the media device, while the media content is being presented to the user, an offset time corresponding to a difference between the first time and a second time corresponding to an occurrence of the phrase which has been qualified by the media device as an unique phrase within the closed-caption information;
    logging, with a processor, viewing behavior of the user based on the media content, the offset time, and an event type associated with the user interface event, wherein the logging includes creating a log file including a media content ID, a user ID, the event type, the phrase qualified as an unique phrase, and the offset time; and
    transmitting the log file to a server configured to aggregate the log file with a plurality of additional log files to characterize viewing behavior of a plurality of users.

2. The method of claim 1, wherein the user interface event is a trick-mode event.

3. The method of claim 1, wherein the trick-mode event includes a fast forward event, a rewind event, a resume event, a skip forward event, a skip backward event, a progress bar event, and a slow-motion event.

4. The method of claim 1, wherein the media device is a placeshifting device.

5. A system for tracking user viewing behavior comprising:
    a server configured to store a plurality of log files characterizing user viewing behavior; and
    a media device communicatively coupled to the server, the media device configured to:

present media content to a user, the media content including closed-caption information;

determine that a user has initiated, at a first time, a user interface event that modifies a playback rate of the media content;

determining, by the media device, whether a phrase comprising a string of characters appearing within close caption information is unique by disqualifying recurring catch-phrases of character strings occurring multiple times in a program as not likely sufficiently unique and qualifying relatively rare phrases of character strings occurring in the program as likely sufficiently unique, and further deeming a character string occurring only once in the program as preferentially qualifying as unique;

determine, at the media device while the media content is being presented to the user, an offset time corresponding to a difference between the first time and a second time corresponding to an occurrence of the phrase of the string of characters which has been qualified by the media device as an unique character string within the closed-caption information;

characterize viewing behavior of the user based on the media content, the offset time, and an event type associated with the user interface event;

create a first log file including a media content ID, a user ID, the event type, the phrase of the string of characters qualified as an unique character string within the closed-caption information, and the offset time; and transmit the first log file to a the server.

6. The system of claim 5, wherein the user interface event is a trick-mode event.

7. The system of claim 6, wherein the trick-mode event includes a fast forward event, a rewind event, a resume event, and a slow-motion event.

8. The system of claim 5, wherein the server is further configured to utilize the plurality of log files to identify scenes contained in the media content that are often skipped by users.

9. The system of claim 5, wherein the server is further configured to utilize the plurality of log files to identify scenes contained in the media content that are often replayed by users.

10. The system of claim 5, wherein the server is further configured to utilize the plurality of log files to identify advertisements contained in the media content that are often viewed by users.

11. The method of claim 1, further comprising, at the server, utilizing the plurality of log files to identify scenes contained in the media content that are often skipped by users.

12. The method of claim 1, further comprising, at the server, utilizing the plurality of log files to identify scenes contained in the media content that are often replayed by users.

13. The method of claim 1, further comprising, at the server, utilizing the plurality of log files to identify advertisements contained in the media content that are often viewed by users.

14. A method of tracking user viewing behavior, comprising:

presenting media content to a user via a media device, the media content including closed-caption information;

determining that a user has initiated, at a first time, a trick mode event that modifies a playback rate or playback position of the media content;

determining, by the media device, whether a phrase comprising a string of characters appearing within close caption information is unique by disqualifying recurring catch-phrases of character strings occurring multiple times in a program as not likely sufficiently unique and qualifying relatively rare phrases of character strings occurring in the program as likely sufficiently unique, and further deeming a phrase of a character string occurring only once in the program as qualifying as preferentially unique;

determining, at the media device, an offset time corresponding to a difference between the first time and a second time corresponding to an occurrence of the phrase of the string of characters qualified as unique within the closed-caption information, wherein the offset is associated with a temporal distance between the character string qualified as unique and the trick-mode event wherein the character string qualified as unique only occurs within the program being viewed;

creating a log file including the media content ID, a user ID, the trick mode event type, the unique string, and the offset time;

transferring the log file at regular intervals, in response to a transfer request from a remote aggregation server to the media player, to the remote aggregation server to determine trends comprising trick-mode event and user behavior based on at least the transferred log file and a plurality of similar transferred log files from other media devices; and identifying, at the remote aggregation server, the trends comprising the trick-mode event and the user behavior utilizing at least the transferred log file, comprising: scenes contained in the media content frequently skipped by the user, scenes contained in the media content often replayed by the user, and types of commercials contained in the media content that are most frequently viewed by the user.

* * * * *